United States Patent [19]
van Haag

[11] Patent Number: 5,419,242
[45] Date of Patent: May 30, 1995

[54] ROLLER ARRANGEMENT WITH A DEFLECTION COMPENSATION ROLLER

[75] Inventor: Rolf van Haag, Kerken, Germany

[73] Assignee: Sulzer Papertec Krefeld GmbH, Krefeld, Germany

[21] Appl. No.: 198,902

[22] Filed: Feb. 18, 1994

[51] Int. Cl.⁶ .................................................. B30B 3/04
[52] U.S. Cl. .................................. 100/47; 100/162 B; 72/241.6; 492/7; 492/20
[58] Field of Search ..................... 100/47, 162 B; 72/241.6; 492/7, 20

[56] References Cited

U.S. PATENT DOCUMENTS

| | | |
|---|---|---|
| 4,213,232 | 7/1980 | Biondetti et al. ............... 492/7 |
| 4,299,162 | 11/1981 | Hartmann et al. ............ 100/162 B |
| 4,520,723 | 6/1985 | Pav et al. ...................... 100/162 B |
| 4,757,585 | 7/1988 | Niskanen ......................... 492/7 |
| 4,793,250 | 12/1988 | Niskanen ......................... 492/7 |
| 5,063,649 | 11/1991 | Wenzel et al. ................. 492/15 |
| 5,123,150 | 6/1992 | Schiel ............................. 492/7 |
| 5,146,664 | 9/1992 | Biondetti ........................ 492/7 |
| 5,286,245 | 2/1994 | Schiel ............................. 492/7 |
| 5,290,223 | 3/1994 | Lehmann ........................ 492/7 |
| 5,329,849 | 7/1994 | Roerig ......................... 100/162 B |

FOREIGN PATENT DOCUMENTS

| | | |
|---|---|---|
| 0332594 | 9/1989 | European Pat. Off. ........ 100/162 B |
| 2325721 | 4/1976 | Germany . |
| 3734832 | 5/1988 | Germany . |
| 3644170 | 4/1990 | Germany . |
| 4042365 | 11/1992 | Germany . |

Primary Examiner—Stephen F. Gerrity
Attorney, Agent, or Firm—Darby & Darby

[57] ABSTRACT

A roller arrangement with a deflection compensation roller and a counter roller. The deflection compensation roller has a shell, through which a hydrostatic support device is supported on a carrier. The shell-ends are each supported on a ring bearing which is guided in an action plane and is radially adjustable and can be loaded by a force in the slide direction. The shell-ends can each be loaded by a torque which has an axis perpendicular to the action plane. In this way, the deflection of the shell can be matched to be proportionate to the deflection of the counter roller.

10 Claims, 4 Drawing Sheets

ROLLER ARRANGEMENT WITH A DEFLECTION COMPENSATION ROLLER

FIELD OF THE INVENTION

The present invention relates generally to a roller arrangement. More specifically, the present invention relates to a roller arrangement having a deflection compensation roller, which together with a counter roller forms a pressure gap.

BACKGROUND OF THE INVENTION

In a deflection compensation roller, such as the one disclosed in DE-PS 36 44 170, a shell of the deflection compensation roller is movable relative to a functional plane. However, this disclosure has difficulties in achieving a uniform compression when the deflection compensation roller interacts with a pivoting roller.

With conventional roller arrangements, it is possible to apply forces at various spots on the shell-ends of the deflection compensation roller. However, the shell ends are disposed outside of the support device. Thus, there are still imperfections in the uniformity of the compressive stress applied in a pressure gap between the deflection compensation roller and the counter roller.

Another example of a roller arrangement is disclosed in DE-OS 40 42 365, which has a deflection compensation roller with a roller shell. A fixed support is disposed at the ends of the shell and is connected to a carrier by bearings. In addition to the beatings, there are torque producing elements which apply a torque to the shell-ends or the ring beating at an axis which is perpendicular to the action-plane.

Not withstanding the aforementioned pressure rollers, there are still major problems involved, including tile basic problem of designing a roller which provides a more even-line or uniform deflection of the deflection compensation roller over the entire roller width.

SUMMARY OF THE INVENTION

The present invention is directed to a roller arrangement for processing paper and includes a deflection compensation roller. A radially adjustable roller is double compensated by a force and a torque with the use of an energizer, as well as a torque producing element, to compensate for the compressive stress over the entire roller width. The deflection of the counter roller depends essentially on the distance between both bearings which support the trunnions of tile counter roller. The roller shell is, as a general rule, shorter than this distance between the beatings. With the help of the forces produced by the energizer, as well as the bending moments produced by the torque producing element, one can load the roller shell, as desired. The desired compensation can be achieved if the distance of the support of the trunnions corresponds to the length of the counter roller. In this case, the deflection of the roller shell will optimally match that of the counter roller.

A further design of the present invention adjusts the control device to have the force and the torque vary based on the width of the path to be treated. It is therefore preferable to have the control device adjust the force and the torque depending on the average line-force in the pressure gap.

The control device may have a characteristic curve register which is dependent on the selected average line-force and/or the width of the path to be treated and provides pre-determined pressures to the support-elements as well as the energizer and the torque producing element. A group of the width-depending characteristic curves are stored in the control device for each average line-force. In addition, the pressures could be computed corresponding to the path-width and line-forces. One can, thus, be assured that the counter roller matches the deflection curve bending-line.

It is also advantageous that the control device adjusts the forces and torque proportional to each other at a given contact-length between the rollers. This proportionality is based on the fact that with a change of bearing-force exerted on an actual trunnion on a selected spot of the associated roller, the actual bending-force and bending moment in the same location will show a proportional change.

A preferred design for the energizers includes a piston-cylinder unit disposed between a carrier and a ring bearing. This arrangement requires less space and the forces are produced on the carder and are led directly into the roller shell.

The torque producing element is preferred to have a pressure-plate, pressure-chamber units which am disposed between both sides of a center-flange, and two support-flanges. The center flange is fastened to the carrier and the support-flanges are fastened to the shell-ends. This design also makes it possible to place the torque producing element in a space-saving manner.

The present invention has the additional advantage to supply the cylinder of the energizer and the pressure-chambers of the torque producing element in the carrier through pressure media lines.

In a preferred embodiment, an energizer is disposed on the side remote from the pressure gap of the ring bearing. To achieve the desired compensation, it is sufficient in many instances to place the energizers on only this side, especially when narrow paths are treated which are disposed between the ring beatings and/or if a high line force is present.

In other cases, it is recommended to provide an energizer on the side of the ring bearing which is directed toward the pressure gap. This is especially important for the treatment of wide paths which overlap the ring bearings and/or have a lower line force. An energizer which is arranged in this fashion produces a pressure force similar to the elements of the support device and makes it necessary in some cases to provide pressure media through a joint line.

BRIEF DESCRIPTION OF THE DRAWINGS

The above and still further objects, features, and advantages of the present invention will become apparent upon consideration of the following detailed description of a specific embodiment thereof, especially when taken in conjunction with the specific accompanying drawings and wherein.

DETAILED DESCRIPTION OF THE PRESENTLY PREFERRED EMBODIMENTS

Figure 1:
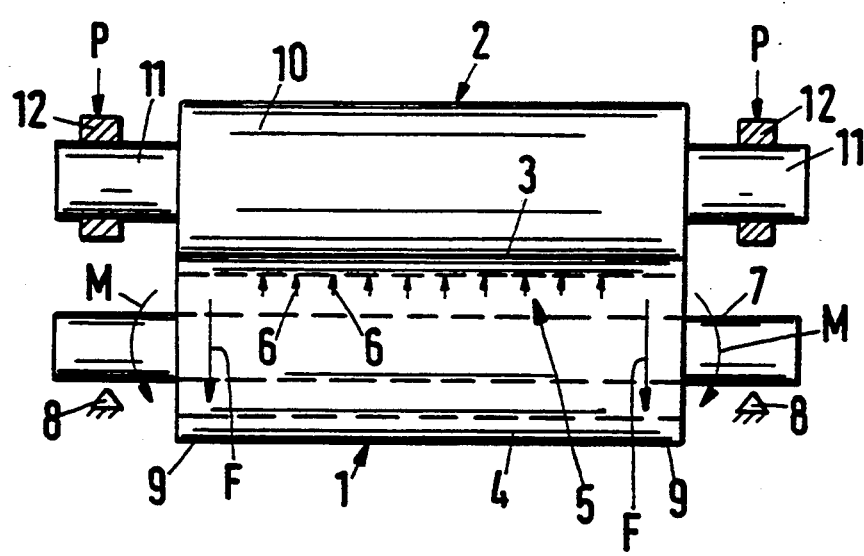
FIG. 1 is a schematic drawing of the roller arrangement according to the present invention.

Referring now to FIG. 1, a roller arrangement with a deflection compensation roller 1 and a counter roller 2, are illustrated. A roller gap 3 is created between the deflection-compensation roller 1 and counter roller 2.

Figure 3:
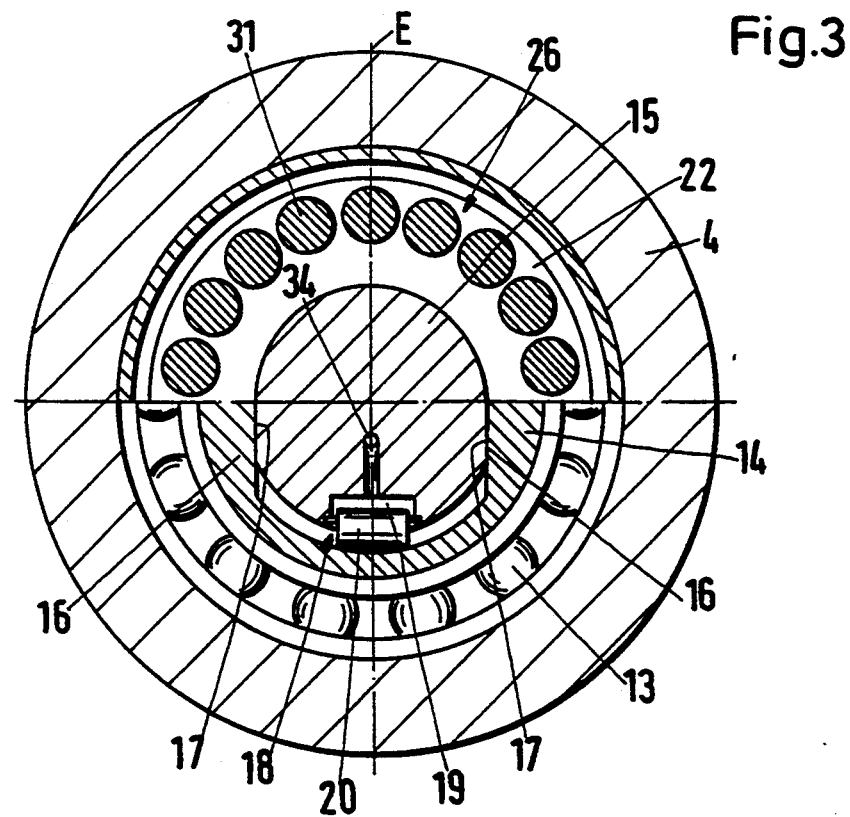
FIG. 3 is a cross-section along line A-B in FIG. 2.

The deflection compensation roller includes a shell 4, which is supported by a hydrostatic support element 5. Support element 5 is illustrated schematically with a row of hydrostatic support elements 6 which are supported by a carrier 7. Carrier 7 penetrates shell 4 and is supported at both ends and by beatings 8. Carrier 7 is fixed against rotation. Shell 4 is guided with respect to carder 7 and is radially movable. An action-plane E is illustrated in FIG. 3. Shell 4 can be moved in action-plane E while the axes of deflection compensation roller 1 and carrier 7 penetrate the pressure or roller gap 3. In addition, shell-ends 9 can be loaded by forces F and torque M which run in the action-plane and whose axes are perpendicular to the action-plane E. The axis of the torque is disposed out of the plane of the sheet of paper as illustrated in FIG. 1.

The counter roller 2 has a roller-body 10 and two trunnions 11 which are supported and pivoted in beatings 12. Beatings 12 are adjustable in the action plane E and can be loaded with a force P.

Figure 2:
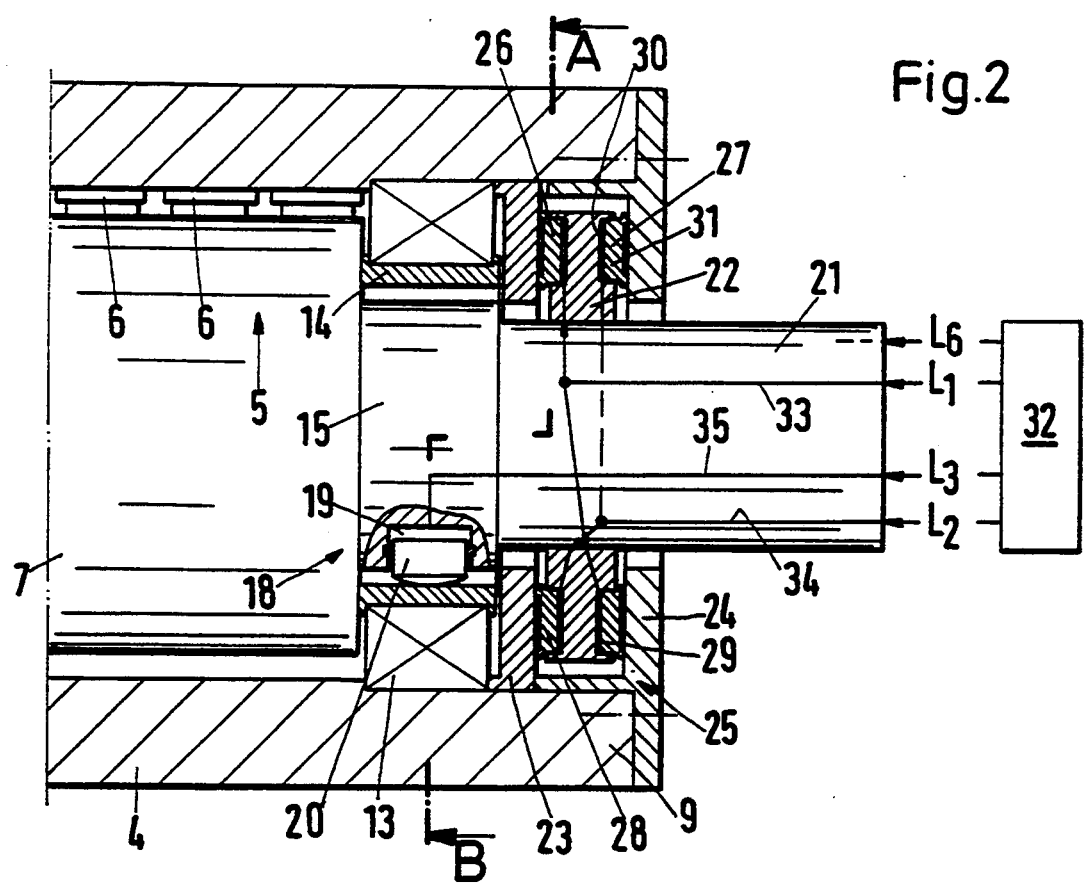
FIG. 2 is a longitudinal section through the right end of the deflection compensation roller illustrated in FIG. 1.

With the exemplary embodiment illustrated in FIG. 2 and FIG. 3, the hydraulic support device 5 includes hydrostatic support elements 6 in the form of hydrostatic pressure-shoes which are pressed against the inner circumference of the roller shell 4 by using a pressure medium. The roller-end 9 is supported over a roller beating 13 on a ting bearing 14 which is radially movable in the action-plane E on a section 15 of the carrier 7. Ring bearing 14 has two parallel guide-surfaces 16 which interact with corresponding counter-surfaces 17 on a section 15 of the carrier 7. In an alternate embodiment, an eccentric swivel beating could be provided as shown in DE-OS 36 39 906 or any other known guide could be used in lieu of the disclosed guide assembly.

In order to produce a force F, a hydraulic energizer 18 is provided on the side of section 15 which is remote from the pressure gap 3. Hydraulic energizer 18 includes a cylinder 19 in section 15 and a piston 20 which contacts the beating ring 14.

Attached to section 15 of the carder 7 is a trunnion 21 of a smaller diameter. A center flange 22 is mounted on trunnion 21 and is disposed between two support-flanges 23 and 24, which are fastened to the shell 4. Four sets of units 26, 27, 28, 29 serve as torque producing elements 25. Each unit 26, 27, 28, 29 comprises a pressure chamber 30 and a pressure plate 31. Pressure plate 31 can also be designed as a hydrostatic pressure pad. Each of these sets, in this embodiment, are cylindrical pressure plates in cylindrical pressure chambers arranged in a semicircle. Of course, the units could also take on a different shape. e.g. they could be a semi-ring shaped pressure plate, which is placed in a semi-ting shaped slot, as is shown in DE-OS 40 42 365.

A control device 32 makes available a pressure fluid with the proper pressure suitable for each operation of the individual hydraulic devices. The pressure chambers 30 of the units of sets 26 and 29 will be provided with pressure-fluid via line L1 and a pressure media-line 33 in the trunnion 21. The pressure chambers 30 of the units of sets 27 and 28 will be provided via line L2 and a pressure media-line 34. The cylinder 19 of the energizer 18 will be provided with pressure-fluid via line L3 and a pressure media-line 35 in the trunnion. Additional fines L6 are provided for the pressure fluid supply of the support elements 6. In order to achieve force P and torque M as shown in FIG. 1, the energizer 18 and the units of sets 27 and 28 of the torque producing element 25, must be loaded with pressure fluid.

Figure 4:
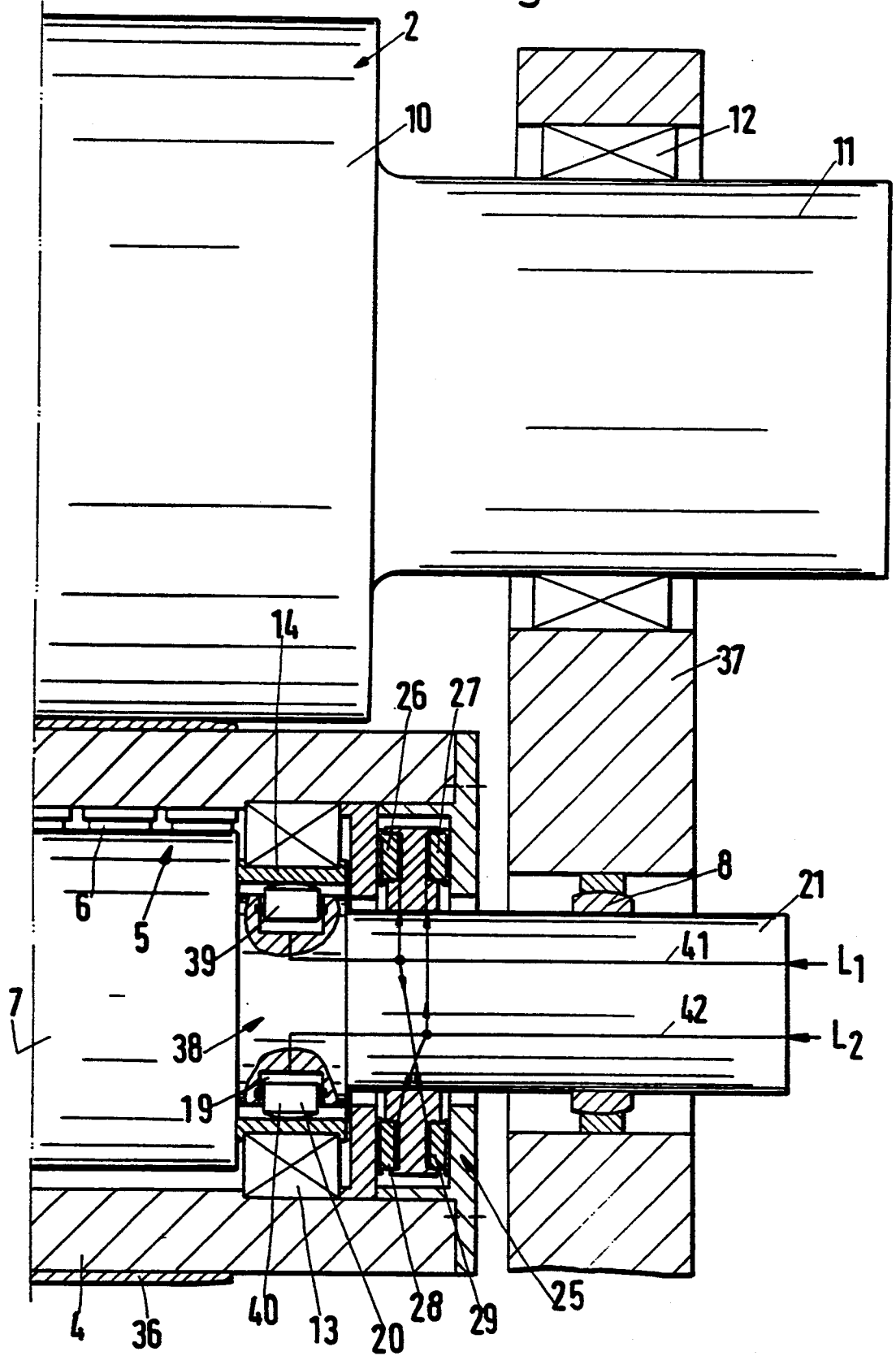
FIG. 4 is a longitudinal section through the right end of a modified form of the roller arrangement of the present invention.

Referring now to FIG. 4, shell 4 has an elastic covering 36 and interacts with the counter roller 2. In this case, the bearing 12 for the trunnion 11 of the counter roller 2 is mounted solidly in machine stand 37. Bearing 8, which is designed as a spherical beating for the trunnion 21 of the carrier 7, is also held tightly in the machine stand 37. Thus, the hydraulic support device 5, with the support elements 6, are the only load sources of the roller-pair, hence the name "self-loaded" deflection compensation roller. The energizer 38 comprises two opposite units 39 and 40, each with a cylinder 19 and a piston 20. The design of the torque producing element 25 corresponds to the one illustrated in FIG. 2 and FIG. 3 and described above. Here the units of sets 27 and 28 of the lower unit 40 of the energizer and the units of sets 26 and 29 of the upper unit 39 of the energizer are coordinated. For the sake of brevity, the description of the torque producing element 25 will not be repeated.

It is especially noteworthy that the two connections L1 and L2 are sufficient. One could connect cylinder 19 of unit 39 directly with the pressure medium line 41 which leads to the pressure chambers of sets 26 and 29, and also the pressure chamber 19 of the unit 40 with the pressure medium line 42 which leads to the pressure chambers of sets 27 and 28. Depending on the operating conditions, pressure is merely fed via the one of connections L1 or L2.

Figure 5:
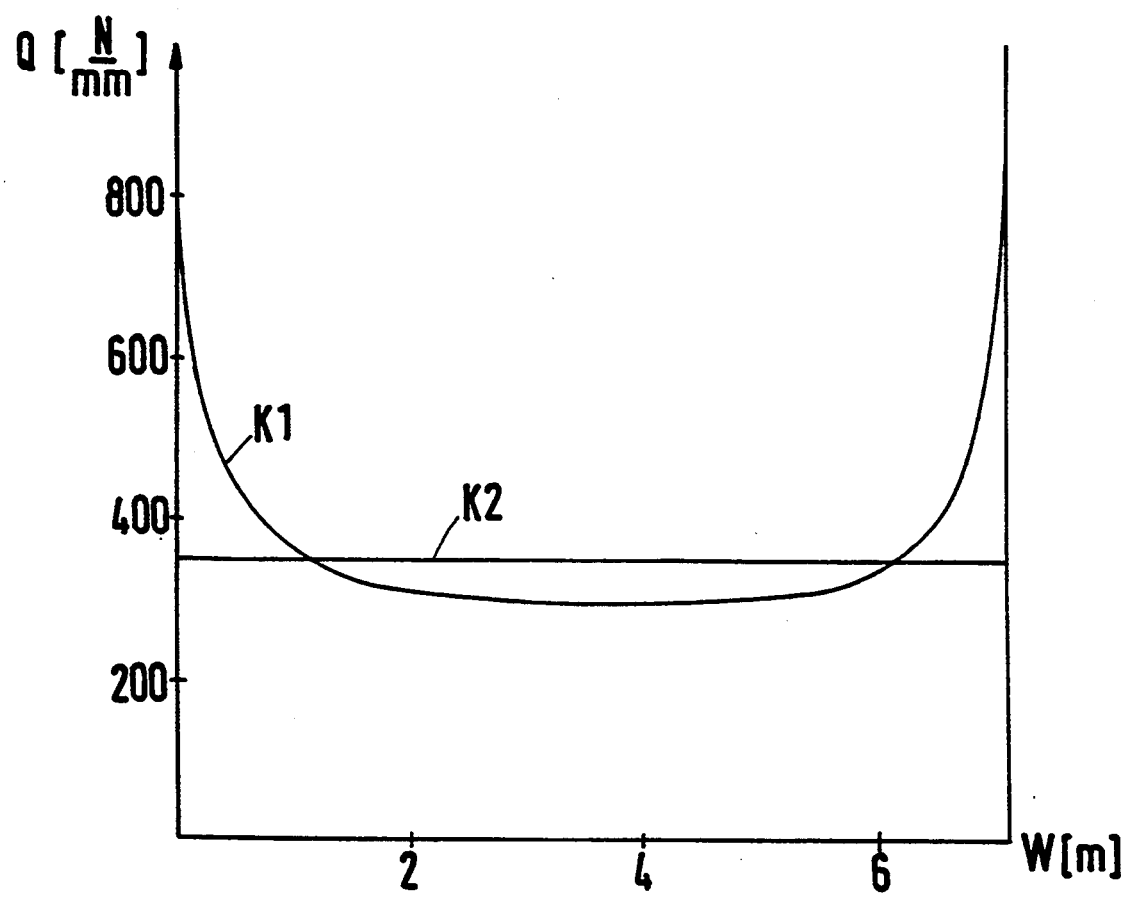
FIG. 5 is a diagram of the compressive stress Q in the pressure gap over a roller width W.

FIG. 5 illustrates the distribution of compressive stress Q over the width W of the deflection compensation roller 1. A Soft-calendar with two rollers and a working-width of 7.27 m was examined. The deflection compensation roller functioned as the upper roller, in contrast to the illustrated design examples. The outside diameter of the roller shell was 87.3 cm, the internal diameter 71.5 cm. The lower roller was used as the heated roller and had an outside diameter of 1.35 m. The bearing distance "a" was 8.92 m. An average line load distribution of 350 N/mm was desirable.

For this purpose, several computations were carried out. For comparison, the following data was entered in FIG. 5:

Curve K1 results when all zones shown with the support elements 6 are loaded with equal hydraulic pressure without the effects of the energizer and torque producing element. In this situation, the line load increases extraordinarily at the ends of the rollers. This example showed results having high end pressure. The hydraulic pressure amounted to 51.9 bar continuously.

Curve K2 shows the energizer 18 and torque producing element 25 fully effective. In this situation, the pressure leading to the support elements 6 continuously was 56.2 bar. The force F was 101.7 kN. The torque M was 114.5 kNm, which could be achieved with a pressure of approximately 60 bar. This amounts to an almost even line-load distribution over the entire roller-width. This could be achieved without overloading the ring bearings 14 or the support-flanges 23, 24.

Figure 6:
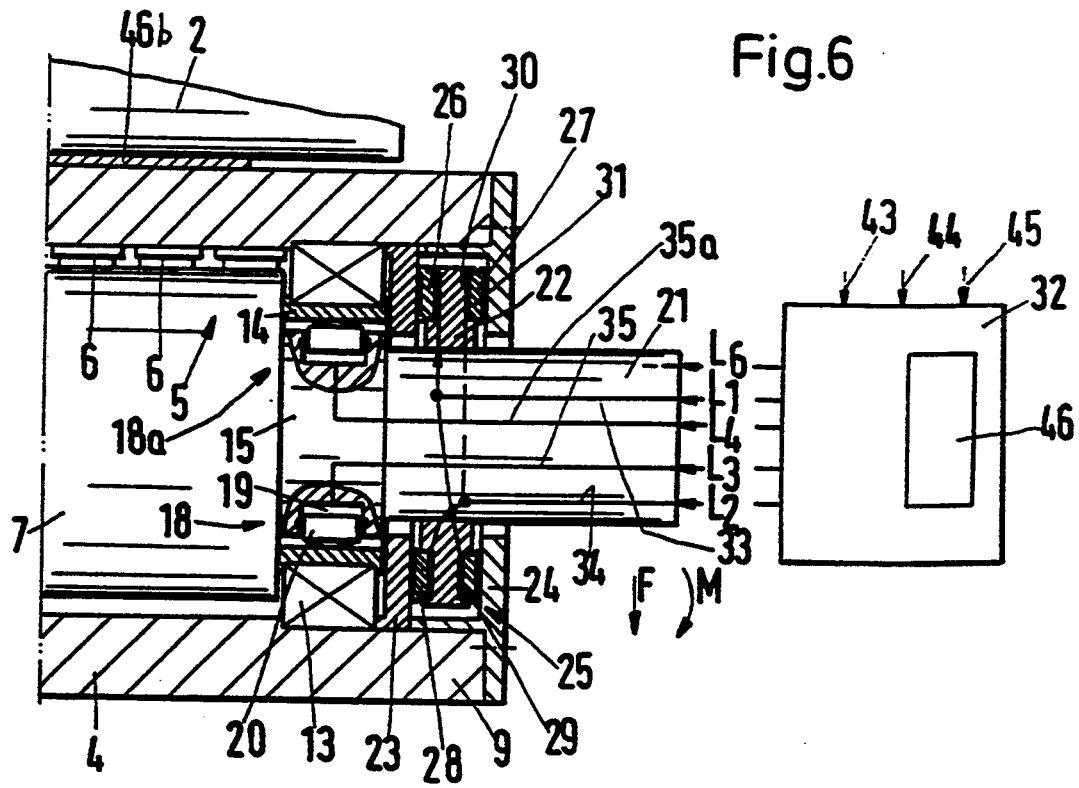
FIG. 6 is a longitudinal section similar to FIG. 2 showing a modified form for the treatment of narrow paths.
Figure 7:
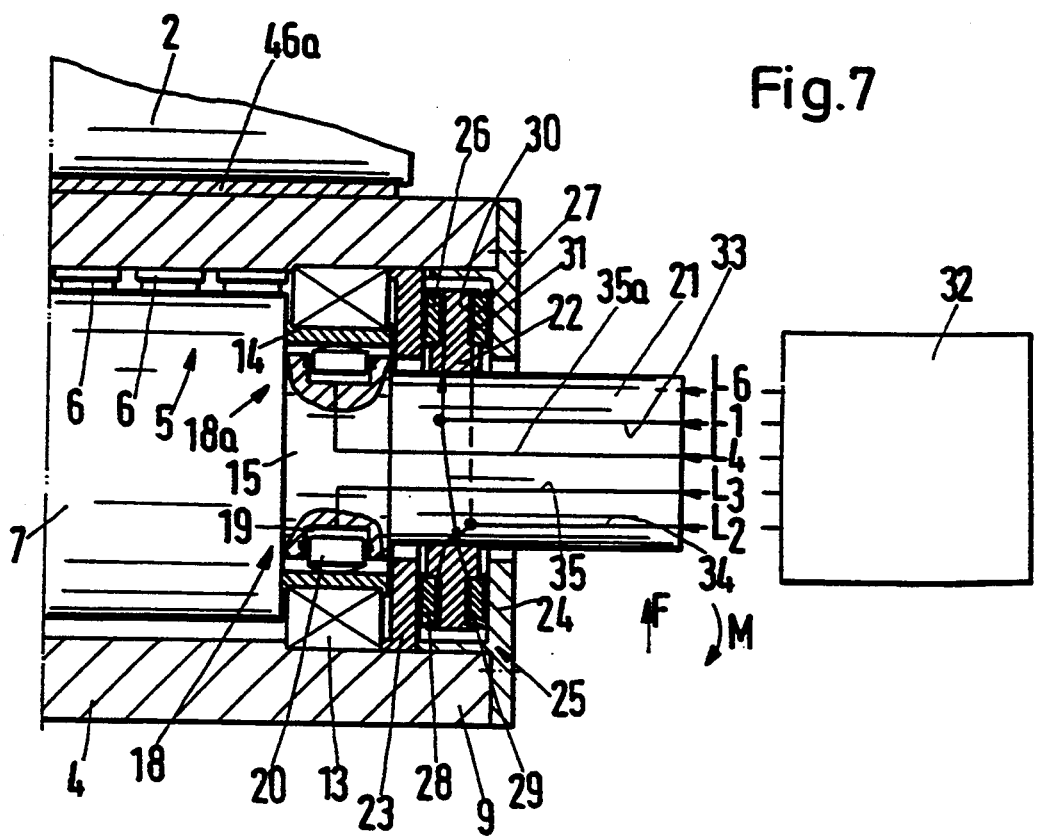
FIG. 7 is a sectional view, similar to FIG. 6, for the treatment of wide paths.

Another embodiment of the present invention is illustrated in FIGS. 6 and 7, which differs from FIG. 2 by having a second energizer 18a, which is located on the ring bearing 14 directed toward the pressure gap 3 and because of this may load the roller shell end in the pressure-direction. This energizer 18a is connected via a pressure medium line 35a with an added connection LA to the control device 32. The control device 32 has a first inlet 43 over which the desired average line-force can be set to, and an inlet 44 through which the pressure distribution can be set in the pressure gap and also an inlet 45 by which the width of the path to be treated can be entered. This input can take place manually or automatically, based on measurements or other methods. The control device 32 has a characteristic curve register 46, in which a number of characteristic curves are stored which consider the average line-force, the width of the product-path and, in certain cases, the line-force profile. Such characteristic curves for the pressures leading to the support elements 6 are known, for example, from DE-PS 32 00 490. Similar characteristic curves are also valid for the pressures directed to the torque producing element 25 and the energizer 18 or 18a. In an alternate embodiment, the control device 32 can also be a computer, which computes the applied pressures based on path-width, line-force and line-force profile.

According to FIG. 6, a small path 46b is illustrated which is completely in the range of the support device 5 and is located between the ring bearings 14. In this case, pressure is applied to the pressure medium lines 34 and 35 with the result that on the right end of the roller shell 4 a clockwise torque M and a force F will occur. The torque M and Force F originate in the energizer 18, counter to the pressure direction, which is indicated by schematic arrows.

Should, however, a wide path 46a be considered, as is shown in FIG. 7, pressure is applied to the pressure medium lines 34 and 35a. By maintaining the clockwise torque M, a force F is produced in the energizer 18a in the pressure direction. The effect is similar to the support forces of the support elements 6. This effect can also be reduced by the proper reduction of the counteracting force required for this compensation.

Without departing from the spirit of the present invention, the design can vary from the illustrated examples in many respects. For example, the roller arrangement could consist of more than two rollers. In place of the individual support elements 6, the support device 5 may consist of pressure-chambers which extend over a portion of the circumference of the roller shell with pressure fluid filled between the roller shell and the carrier. In some cases, it may be appropriate to provide additional support elements on the side opposite to the pressure gap of the carrier 7.

What is claimed is:

1. Roller arrangement comprising:
   a counter roller;
   a deflection compensation roller;
   a pressure gap defined by said deflection compensation roller and said counter roller, said deflection compensation roller comprising a radially movable shell which is supported by and connected to a carrier by a hydrostatic support device, said shell having first and second ends which are each supported by a ring bearing, said first and second ends having first and second support flanges, said ring bearings being radially adjustable in a radial adjustment direction and loaded by a force in said radial adjustment direction by an energizer, said energizer comprising a cylinder and a piston, said first and second ends of said shell are loaded by a torque produced by a torque-producing element which exerts pressure in a direction perpendicular to said radial adjustment direction, onto at least one of said first and second support flanges; and
   a control device for at least one of independently and proportionally controlling and setting a resulting force of the energizer and a resulting torque of said torque-producing element.

2. The roller arrangement according to claim 1, wherein said control device determines said resulting force and said resulting torque based on input from at least one of direct measurement and calculation of a path width to be treated at said pressure gap.

3. The roller arrangement according to claim 1, wherein said control device sets said resulting force and said resulting torque based on input from at least one of direct measurement and calculation of an average line-force in said pressure gap.

4. The roller arrangement according to claim 1, further comprising a center-flange connected to said carrier and positioned between said first and second support flanges which are fastened to said shell ends, wherein said torque-producing element has at least one pressure unit which operates on at least one side of said center-flange and between said first and second support flanges.

5. The roller arrangement according to claim 4, wherein said at least one pressure unit is supplied by a pressure medium line in said carrier.

6. The roller arrangement according to claim 4, wherein said at least one pressure unit comprises a pressure chamber and a pressure plate.

7. The roller arrangement according to claim 4, wherein said at least one pressure unit comprises a piston cylinder unit.

8. The roller arrangement according to claim 1, wherein said energizer is provided on a side of said ring bearing remote from said pressure gap.

9. The roller arrangement according to claim 8, wherein said energizer is provided on a side of said ring bearing adjacent said pressure gap.

10. The roller arrangement according to claim 1, wherein said energizer has operating piston cylinder units between said carder and said ring bearing.

* * * * *

UNITED STATES PATENT AND TRADEMARK OFFICE
CERTIFICATE OF CORRECTION

PATENT NO. : 5,419,242

DATED : May 30, 1995

INVENTOR(S) : Rolf van Haag

It is certified that error appears in the above-indentified patent and that said Letters Patent is hereby corrected as shown below:

In the cover page of the patent, please add --Section [30] FOREIGN APPLICATION PRIORITY DATA February 22, 1993 Germany Appln. No. P 43 05 371.8--.

Signed and Sealed this

Twenty-sixth Day of December, 1995

Attest:

BRUCE LEHMAN

*Attesting Officer*    *Commissioner of Patents and Trademarks*